(12) United States Patent
Schneider et al.

(10) Patent No.: US 10,681,079 B2
(45) Date of Patent: *Jun. 9, 2020

(54) METHOD FOR MITIGATION OF CYBER ATTACKS ON INDUSTRIAL CONTROL SYSTEMS

(71) Applicant: Cyberx Israel Ltd., Herzlia Pituach (IL)

(72) Inventors: Omer Schneider, Kibbutz Yakum (IL); Nir Giller, Hod Hasharon (IL)

(73) Assignee: Cyberx Israel Ltd., Herzlia Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,924

(22) Filed: Jul. 2, 2018

(65) Prior Publication Data

US 2018/0316719 A1 Nov. 1, 2018

Related U.S. Application Data

(63) Continuation of application No. 14/830,776, filed on Aug. 20, 2015, now Pat. No. 10,015,188.

(51) Int. Cl.
*H04L 29/06* (2006.01)
*G05B 23/02* (2006.01)
*H04L 29/08* (2006.01)
*G06F 21/55* (2013.01)

(52) U.S. Cl.
CPC ...... *H04L 63/1441* (2013.01); *H04L 63/1425* (2013.01); *G05B 23/0254* (2013.01); *G06F 21/55* (2013.01); *H04L 67/12* (2013.01)

(58) Field of Classification Search
CPC .. H04L 63/1425; H04L 63/1416; G06F 21/55
USPC .......................................................... 726/23
See application file for complete search history.

(56) References Cited

U.S. PATENT DOCUMENTS

| | | |
|---|---|---|
| 8,578,494 B1 | 11/2013 | Engler et al. |
| 8,872,638 B2 | 10/2014 | Akiyama et al. |
| 9,009,084 B2 | 4/2015 | Brandt et al. |
| 9,628,497 B2 | 4/2017 | Zambon |
| 2003/0212779 A1 | 11/2003 | Boyter et al. |
| 2008/0144835 A1 | 6/2008 | Roy et al. |
| 2008/0291017 A1* | 11/2008 | Yermal ............... H04L 63/1416 340/541 |

(Continued)

FOREIGN PATENT DOCUMENTS

| | | |
|---|---|---|
| JP | 2012226508 | 11/2012 |
| WO | 2015104691 | 7/2015 |

OTHER PUBLICATIONS

Third Party Observation for European Patent Application No. EP20160184702, submitted Jun. 28, 2018. 18 pages.

(Continued)

*Primary Examiner* — Bryan F Wright
(74) *Attorney, Agent, or Firm* — Mark M. Friedman (57) ABSTRACT

Methods and systems for detecting a potential compromise of cyber security in an industrial network are disclosed. These methods and systems comprise elements of hardware and software for generating and analyzing vectors indicative of network behavioral states to establish thresholds for anomalous behavior in the industrial network.

1 Claim, 7 Drawing Sheets

(56) References Cited

U.S. PATENT DOCUMENTS

| | | |
|---|---|---|
| 2008/0295171 A1* | 11/2008 | Singh .................. H04L 63/1416 726/23 |
| 2010/0023307 A1 | 1/2010 | Lee et al. |
| 2011/0288692 A1* | 11/2011 | Scott ....................... G06F 21/55 700/297 |
| 2012/0198541 A1 | 8/2012 | Reeves |
| 2012/0268256 A1 | 10/2012 | Akiyama et al. |
| 2013/0031037 A1 | 1/2013 | Brant et al. |
| 2014/0165182 A1 | 6/2014 | Curry et al. |
| 2014/0165207 A1* | 6/2014 | Engel .................. H04L 63/1425 726/25 |
| 2014/0297572 A1 | 10/2014 | Zambon |
| 2014/0380458 A1 | 12/2014 | Kim et al. |
| 2015/0049634 A1 | 2/2015 | Levchuk et al. |
| 2015/0101048 A1* | 4/2015 | Sridhara ................. G06F 21/55 726/23 |
| 2015/0381642 A1 | 12/2015 | Kim et al. |
| 2016/0078365 A1* | 3/2016 | Baumard .............. G06F 21/552 706/12 |

OTHER PUBLICATIONS

M Caselli et. al., "Sequence-aware Intrusion Detection in Industrial Control Systems", CPSS '15, Proceedings of the 1st ACM Workshop on Cyber-Physical System Security, pp. 13-24, Singapore, Republic of Singapore, Apr. 14, 2015.

Introductory pages of Proceedings of the 1st ACM Workshop on Cyber-Physical System Security, Singapore, Republic of Singapore, Apr. 14, 2015.

Niv Goldenberg, Avihai Wool, "Accurate Modeling of Modbus/TCP for intrusion detection in SCADA systems" Elsevier, SciVerse Science Direct, International journal of Critical infrastructure protection 6 (2013) 63-75. May 4, 2013.

Communication Pursuant to Rule 114(2) EPC—Third Party Observation for application No. EP 20160184702 (75 Pages) Jul. 3, 2018.

* cited by examiner

METHOD FOR MITIGATION OF CYBER ATTACKS ON INDUSTRIAL CONTROL SYSTEMS

CROSS-REFERENCES TO RELATED APPLICATIONS

This application is a continuation of commonly owned U.S. patent application Ser. No. 14/830,776, entitled: METHOD FOR MITIGATION OF CYBER ATTACKS ON INDUSTRIAL CONTROL SYSTEMS, filed on Aug. 20, 2015, now U.S. Pat. No. 10,015,188, the disclosure of which is incorporated herein in its entirety.

TECHNICAL FIELD OF THE INVENTION

The present invention relates to methods and systems for mitigating cyber attacks on industrial control systems.

BACKGROUND

An Industrial Control System (ICS) includes combinations of control components (e.g., electrical, mechanical, hydraulic, pneumatic) that act together to achieve, an industrial objective (e.g., manufacturing, transportation of matter or energy).

Many ICS comprise, for example, a number of field sites where industrial objectives are accomplished, together with, for example, a control center which monitors and manages the industrial objective. The control center and field sites are linked via, for example, telecommunications channels or data links. The control center monitors or manages the industrial objective using, for example, industrial control protocols such as DNP3 (Distributed Network Protocol), Modbus, OPC, and the like.

Attacks by malicious parties on industrial control systems have been an increasing concern. This is because ICS were 'designed insecure', with the assumption of air gap between the intranet and the internet. Cyber attacks on ICS have already disrupted critical infrastructure and in the future may cause even more profound damage to facilities, critical services, the environment, and even human life.

SUMMARY OF THE INVENTION

The present invention provides for mitigation of cyber attacks on ICS as it provides an accurate way of detecting when an attack is underway. Moreover, the present invention effectively responds to a detected attack by taking active steps to halt the intrusion without impacting the operation of crucial industrial infrastructure.

The following is an exemplary and non-limiting list of threats to modem ICS, which are mitigated by the present invention:

1. Viruses capable of masquerading as a Programmable Logic Controller (PLC) and transmitting traffic in order to cause harm to an ICS system.
2. Code injection into the Human-Machine Interface (HMI) application, by recognizing the profile of the communication within critical infrastructure networks.
3. Exploitation of ICS protocols such as Modbus, DNP3, etc.
4. Malicious activities originating from hosts which do not reside on the operational network.
5. Exploitation of communication protocols, which are not ICS oriented, but are common in operational networks, such as: Hyper Text Transfer Protocol (HTTP), File Transfer Protocol (FTP), Server Message Block (SMB), NetBios.
6. Unauthorized operations being taken by authorized users within the operational network, which are outside the scope of their permitted work.

The following is an exemplary and non-limiting list of solutions which the invention provides for, which may be attended to by operational and security personnel:

1. A solution for learning the traffic being generated by different PLCs found on the network. An attempt to deviate from these patterns will be detected,
2. A solution for learning the traffic being generated by different HMIs found on the network. An attempt to deviate from these patterns will be detected. This profile includes attempts to perform code injection.
3. A solution of performing traffic analysis according to specifications, i.e., reviewing the traffic being transmitted on the network and validating it according to known specifications.
4. A solution for modeling the behavior of the network as a state machine. This solution can automatically and accurately map the elements operating on the network, and to model their behavior as a finite set of states. It then tracks the behavior of each elements according to the model that was constructed and that is considered as legitimate. Whenever a malicious actor starts operating on the network, whether inside or outside of the network, the resulting traffic will be detected as violating the state machine's model.
5. A solution for profiling the usage of IT (Information Technology) protocols inside operational environments, as part of the state machine described in item 4. This can be accomplished due to the fact that most of the communications is machine-to-machine based, and therefore very well defined (compared to regular IT networks).
6. A solution for profiling the user behavior inside operational environments, as part of the state machine described above. This can be accomplished due to the fact that a user operating inside an operational network usually has a very well-defined role and activities (in relation to users in regular IT networks).

Embodiments of the present invention are directed to a method, which is computer implemented, for detecting a potential compromise of cyber security in an industrial network. The method comprises: establishing a baseline of site-acceptable network behavior comprising a list of network states and transition probabilities, wherein a transition probability denotes an estimated probability of a first network state being followed temporally by a second network state during normal network operation; establishing a threshold representing the probability below which a sequence of network states is anomalous; determining a probability for the occurrence of a sequence of network states as obtained from a particular stream of packets, according to the baseline of site-acceptable network behavior; and, taking protective action according to whether the determined probability is below the established threshold.

Optionally, the establishing a baseline of site-acceptable network behavior comprising a list of network states and transition probabilities comprises: analyzing a series of packets representing normal network behavior, to determine a temporal sequence of network states; and, computing the probability of a first network state being followed temporally by a second network state, according to the number of times that the first network state is followed temporally by the second network state in the determined temporal sequence of network states.

Optionally, the particular stream of packets comprises packets received in monitoring the operation of the industrial network for potential cyber attack.

Optionally, the industrial network utilizes the Modbus protocol.

Optionally, the industrial network utilizes Distributed Network Protocol 3 (DNP3).

Optionally, the sequence of network states derived from a particular stream of packets includes "k" successive network states, Where "k" is greater than two.

Optionally, the taking protective action comprises raising an alert.

Optionally, the taking protective action comprises blocking a packet.

Optionally, the taking protective action comprises disabling a node in the network.

Optionally, the analyzing a series of packets representing normal network behavior, to determine a temporal sequence of network states comprises determining a network state according to the combination of Modbus source, Modbus destination, and Modbus function fields in the analyzed packet.

Optionally, the alert comprises forensic data.

Embodiments of the present invention are directed to a computer system to detecting a potential compromise of cyber security in an industrial network. The computer system comprises: a storage medium for storing computer components; and a computerized processor for executing the computer components comprising: a first computer component for establishing a baseline of site-acceptable network behavior comprising a list of network states and transition probabilities, wherein a transition probability denotes an estimated probability of a first network state being followed temporally by a second network state during normal network operation; a second computer component for establishing a threshold representing the probability below which a sequence of network states is anomalous; a third computer component for determining a probability for the occurrence of a sequence of network states as obtained from a particular stream of packets, according to the baseline of site-acceptable network behavior: and, a fourth computer component for taking protective action according to whether the determined probability is below the established threshold.

Embodiments of the present invention are directed to a computer-usable non-transitory storage medium having a computer program embodied thereon for causing a suitable programmed system to detecting a potential compromise of cyber security in an industrial network, by performing the following steps when such program is executed on the system, the steps comprising: establishing a baseline of site-acceptable network behavior comprising a list of network states and transition probabilities, AA/herein a transition probability denotes an estimated probability of a first network state being followed temporally by a second network state during normal network operation; establishing a threshold representing the probability below which a sequence of network states is anomalous; determining a probability for the occurrence of a sequence of network states as obtained from a particular stream of packets, according to the baseline of site-acceptable network behavior; and, taking protective action according to whether the determined probability is below the established threshold.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as an industrial computer (Remote Terminal Unit (RTU), Intelligent Electronic Device (IED, Programmable Logic Controller (PLC) appliance), a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any human-machine interfaces (HMI), through which certain functionality may be implemented.

The term "linked" as used herein includes both wired or wireless links, either direct or indirect, and placing the computers, including, servers, components and the like, in electronic and/or data communications with each other.

The term "deep packet inspection" as used herein refers to a form of computer network packet filtering that examines the data part (and possibly also the header) of a packet as it passes an inspection point, searching for protocol non-compliance, viruses, spam, intrusions, or the like.

The term "virtual server" as used herein refers to a server that shares computer resources with other virtual servers i.e. it is not a dedicated server wherein the entire computer is dedicated to running the server software. Virtual servers may exist, for example, as guests in public or private cloud computing deployments.

The term "big data" refers to a high-data, high-velocity storage which resides, for example, on multiple nodes.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below, In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings, With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE INVENTION

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

The present invention may be embodied in a system, method or computer program product. Accordingly, aspects of the present invention may take the form of an entirely hardware embodiment, an entirely software embodiment (including firmware, resident software, micro-code) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

The invention provides, in various embodiments, methods and systems for mitigation of cyber attacks on, for example, industrial control systems and constituent devices, networks, and infrastructure. The invention is described in detail and exemplarily for an appliance protecting an electrical power infrastructure which utilizes the Modbus control protocol. The invention may also protect, for example, industrial facilities including but not limited to chemical plants, electrical power generation, transmission and distribution systems, water distribution networks, and wastewater treatment facilities, and using, for example, other protocols for industrial networks such as Distributed Network Protocol (DNP3), Object Linking and Embedding for Process Control (OPC), and the like.

Some embodiments of the present invention are directed to an Industrial Protection Technology Server which receives, for example, a copy of each packet that enters or traverses the industrial network.

The invention may also be embodied, for example, in a number of physical or virtualized servers which may be collocated or may be dispersed through the industrial infrastructure. The invention may also be embodied, for example, in hardware or software modules that are collocated within packet forwarding devices or packet forwarding servers/gateways, so that the invention receives each packet as it traverses the forwarding device (rather than receiving a copy of the packet).

The industrial Protection Technology Server operates in, for example, two phases: a learning phase, and a protection phase. During the learning phase, the Industrial Protection Technology Server receives real time or replayed packets which are known to represent normal operation of the ICS network, The Industrial Protection Technology Server extracts data from these packets using Deep Packet inspection (DPI), and may also, for example, collect packet metadata such as, for example, arrival time The Industrial Protection Technology Server analyzes this data to construct a "state machine" that captures the periodic properties of the communication on the ICS network. An example of ICS network communication periodic properties can be seen in the ease of a human-machine interface (HMI) device which repeatedly polls every programmable logic controller (PLC) at a fixed frequency, so that a certain pattern in the traffic is generated. An algorithm in the Industrial Protection Technology Server calculates the states of the PLCs from observing the packets captured in the communication between the PLC slave and its master.

The Industrial Protection Technology Server transitions between learning phase and protection phase according to, for example, a command invoked by a human administrator on a console of the Industrial Protection Technology Server. Alternatively, the transition may be triggered automatically by, for example, a timer, an event, or the like.

During the protection phase, the Industrial Protection Technology Server receives, for example, real time or replayed packets so that it may determine whether anomalous events are taking place on the ICS network. The Industrial Protection Technology Server extracts data from these packet's using Deep Packet Inspection (DPI), and also, for example, collects packet metadata such as, for example, arrival time. The ICS uses, for example, this data in conjunction with the state machine constructed during the learning phase to determine whether particular packets are normal or anomalous.

When an anomalous packet is detected, the industrial Protection Technology Server takes protective action such as, for example, alerting a site's security officer via a message to a console or the like. Alternatively, the Industrial Protection Technology Server may, for example, take action to block the packets that are part of the suspected attack, or take action to automatically shut down a network-attached device that appears to have been compromised.

Figure 1:
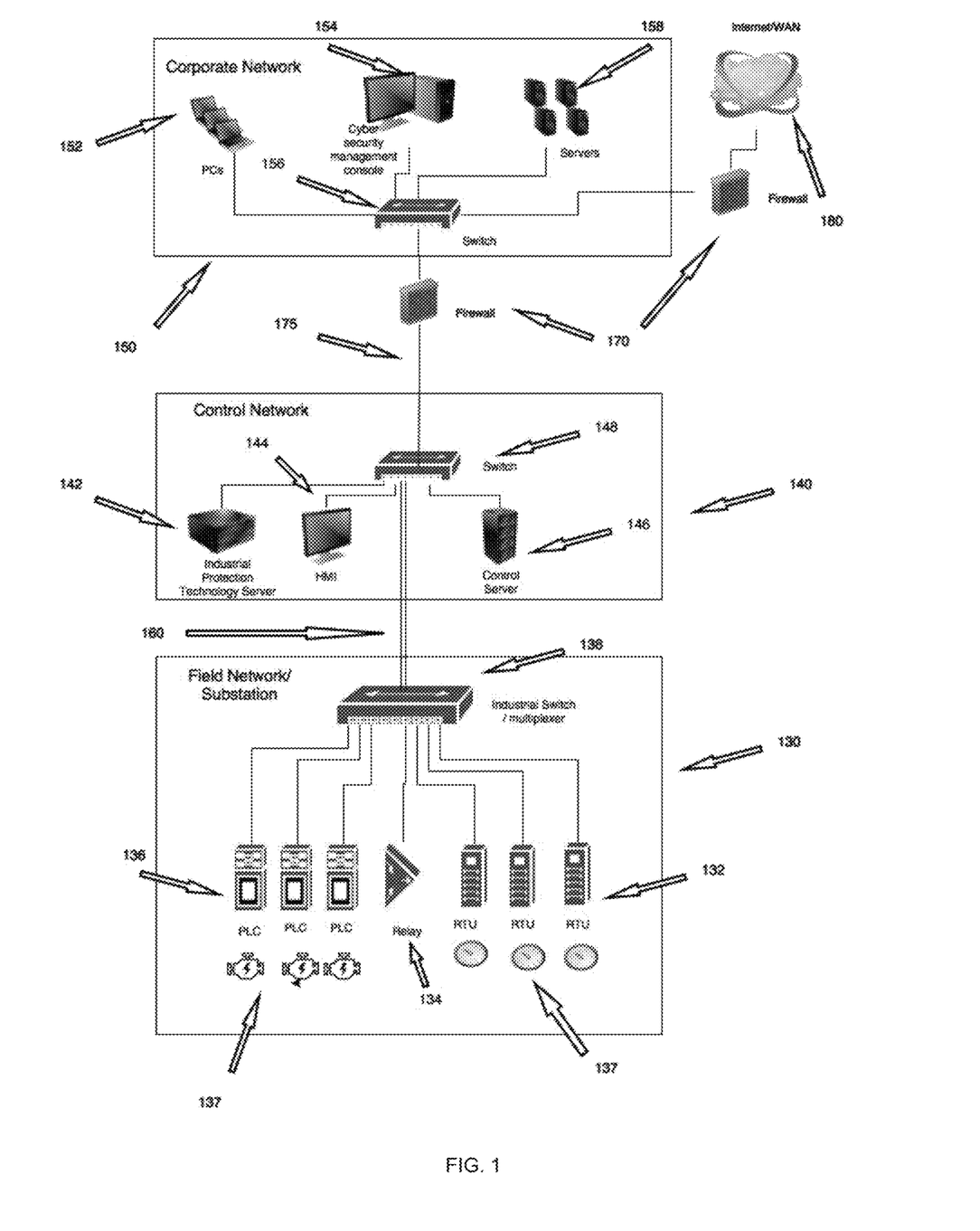
FIG. 1 is a diagram illustrating a system environment in which an embodiment of the invention is deployed.

Reference is now made to FIG. 1, which shows an exemplary system environment (based on topologies described in National Institute of Standards and Technology (NIST) 800-82) including an Industrial Protection Technology Server embodying the invention which protects an ICS. Examples of ICS include: power generation systems; oil and gas upstream, midstream or downstream systems; and wastewater plants. The ICS comprise, for example, three sections: the field network/substation 130, the control network 140, and the corporate network 150.

There may be many instances of the field network/substation 130 in a deployment. The field network/substation 130 includes, for example, equipment 137 dedicated to power generation and to voltage monitoring. This equipment 137 is linked to a network via, for example, Remote Terminal Units (RTUs) 132, Relay Modules 134, or Programmable Logic Controllers (PLCs) 136 supporting, for example, the Modbus protocol. These devices act, for example, as slave devices which respond to read register, write register, and other control commands from the Control Server 146.

The RTUs 132, PLCs 136, and Relay Modules 134 in the field network substation 130 are, for example physically linked to a network. The, network is, for example, a serial link attaching each device to an industrial switch or multiplexer 138 which also attaches to, for example, a field network-control network communications link 160 that provides connectivity between the field network substation 130 and the control network 140.

The field network-control network communications link 160 is, for example, a wired link such as, for example, optical Ethernet. The control protocol used to manage the RTUs 132, Relay Modules 134, and PLCs 136 may be tunneled over, for example, IP/Ethernet, enabling use of, for example, Modbus-over-TCP/IP.

Alternatively the field network-control network communications link 160 may be another kind of link such as, for example, General Packet Radio Service (GPRS), Category 5 twisted-pair Ethernet, and the like.

Alternatively, the control network 140 and field network 130 may, for example, be integrated in a single network entity.

The control network 140 includes the control server 146 which acts, for example, as the ICS master using, for example, the Modbus protocol to control, for example, the RTUs 132, Relay Modules 134, and PLCs 136. The control server 146 is linked, for example, via Ethernet to, for example, an Ethernet switch 148 which is also linked, for example, to the field network-control network communications link 160.

The control network also includes, for example, the industrial Protection Technology Server of the invention 142 and its associated human-machine interface (HMI) 144, which both link, for example, to the switch 148. The switch 148 is configured so that, for example, every packet received by the switch 148 is copied also to the Industrial Protection Technology Server 142. This may be accomplished, tot example, using port mirroring technology such as Switch Port ANalyzer (SPAN). Alternatively, test access point (TAP) technology may be used.

Alternatively, the Industrial Protection Technology Server 142 may link, for example, directly to the industrial switch or multiplexer 138.

The Ethernet switch 148 is also linked to for example, the control network-corporate network communications link 175. The control network-corporate network communications link 175 is, for example, an Ethernet link and connects, for example to the corporate network switch 156.

Alternatively the control network-corporate network communications link 175 may be another kind of link such as, for example, General Packet Radio Service (GPRS). Category 5 twisted-pair Ethernet, and the like.

Alternatively, the corporate network and control network may, for example, be integrated in a single network entity.

The corporate network 150 is linked to the control network 140 via the control network-corporate network communications link 175. The corporate network may include, for example, personal computers (PCs) 152, and servers 158.

The cyber security management console 154 is the device that receives, for example, indications from the Industrial Protection Technology Server 142 when a potential cyber attack has been detected. The cyber security management console 154 also links to the corporate network switch 156 via, for example, twisted-pair copper Ethernet.

Figure 2:
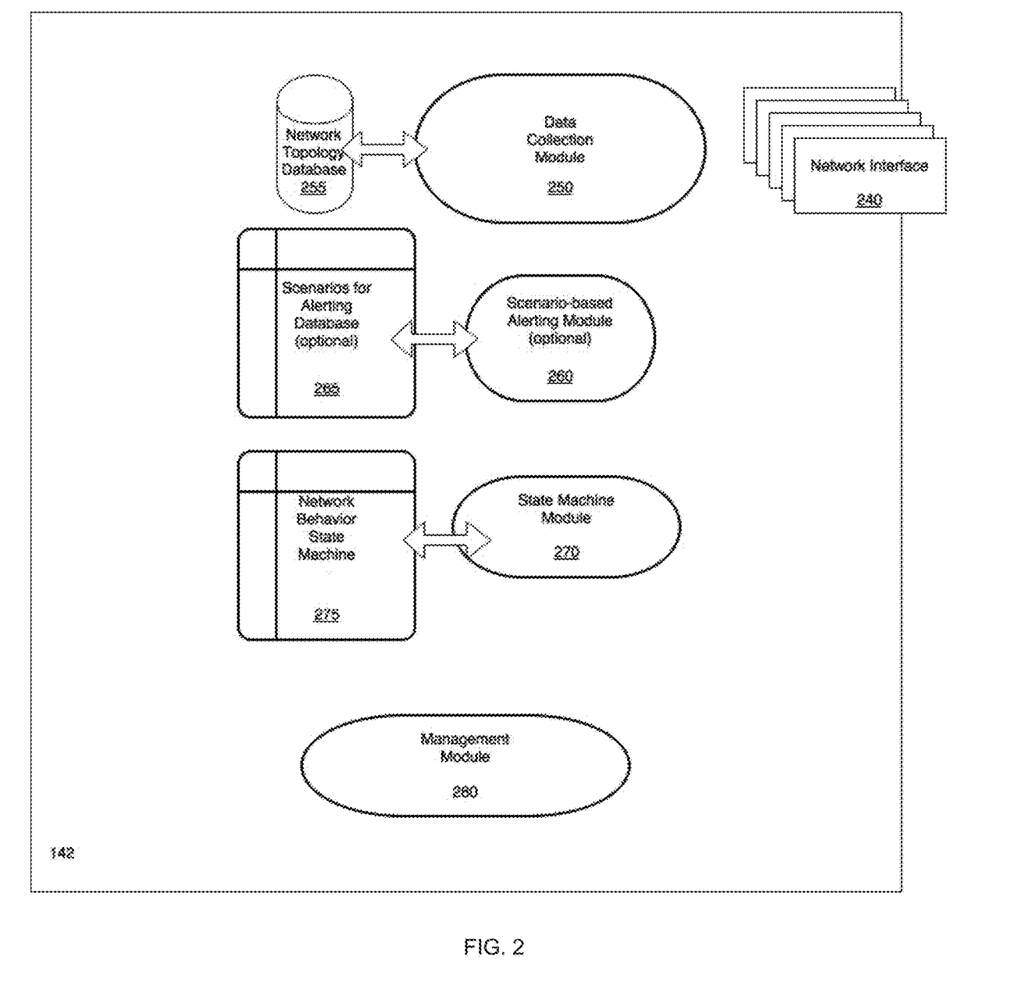
FIG. 2 is a diagram of the architecture of an exemplary learning and threat detection machine utilizing the invention.

The internal architecture of the Industrial Protection Technology Server 142 is shown in FIG. 2. The Industrial Protection Technology Server 142 includes Network Interfaces 240, Data Collection Module 250, Network Topology Database 255, optional Scenario-based Alert Module 260, optional Scenarios for Alert Database 265, State Machine Module 270, Network Behavior State Machine 275, and Management Module 280. These modules may be, for example, software modules running on a general purpose computer including a CPU, memory, and storage.

The database modules (Network Topology Database 255, optional Scenarios for Alert Database 255, Network Behavior State Machine 275) are implemented, for example, in system storage. Alternatively, some or all of the database modules may, for example, be located in remote servers or in a big data repository located in the Control Network 140 or the Corporate Network 150.

The Network interfaces 240 are, for example, physical, virtual, or logical data links for communication with computers and devices inside or outside the facility.

The Data Collection Module 250 is, for example, a software module which, for example, reads packets from Network Interfaces 240. The Data Collection Module 250 performs Deep Packet Inspection (DPI) on, for example, each received packet, and extracts, for example, packet data and metadata for use by the optional Scenario-based Alert Module 260 and State Machine Module 270.

The Network Topology Database 255 maintains information about the master devices and slave devices that have been detected on the ICS. The Network Topology Database 255 is populated, for example, by the Data Collection Module 250 during the learning phase, and is utilized, for example, by the optional Scenario-based Alert Module 260 and State Machine Module 270, during the protection phase. The process executed by the Data Collection Module 250 is shown below with reference to FIG. 3.

Figure 8:
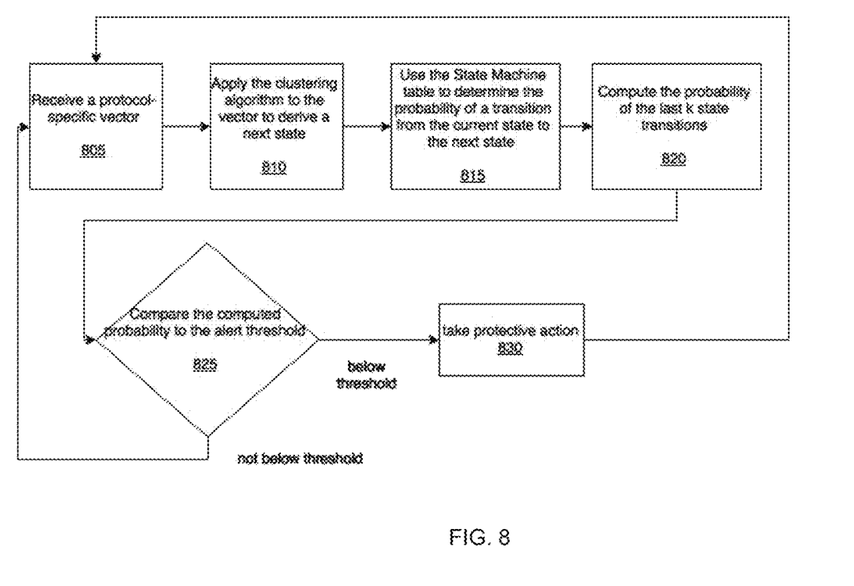

The term "scenario" refers to a set of network event-matching criteria that consists of packet-matching data and/or packet metadata and/or stateful information for matching packets or a series of packets, as well as a directive regarding what to do when the scenario has been satisfied. An exemplary scenario data structure is shown in FIG. 8.

The optional Scenario-based Alert Module 260, when present, applies, for example, each packet received (in the protection phase of operation) to the network event detecting scenarios in the optional Scenarios for Alert Database 265. In this manner, the optional Scenario-based Alert Module 260 detects, for example, packets which are not in compliance with the specifications of the industrial protocols, packets including known threats, operational events such as new ports or failed devices, and the like. When the Scenario-based Alert Module 260 detects such events (by matching one of the scenarios in the Scenarios for Alert Database 265) it, for example, raises an alert, The Scenario-based Alert Module 260 may, for example, utilize the Network Topology Database 255 in its analysis. The detailed process executed by the Scenario-based Alert Module 260 is depicted below with reference to FIG. 5.

The optional Scenarios for Alert Database 265 includes, for example, a list of criteria describing network events. The network event scenarios are loaded into the Scenarios for Alert Database 265 by, for example, the Management Module 280.

The State Machine Module 270 receives, for example, packet data and metadata from, for example, the Data Collection Module 250. The State Machine Module 270 operates differently according to whether the ICS appliance is in learning phase or protection phase. In the learning phase, the State Machine Module 270 analyzes received packet data/metadata to create the Network Behavior State Machine 275. In the protection phase, the State Machine Module 270 analyzes, for example, each received packet in conjunction with the Network Behavior State Machine 275 to identify anomalous network events and, for example, raise an alert. The process executed by the State Machine Module 270 in the learning phase is illustrated in detail below, with reference to FIG. 5. The process executed by the State Machine Module 270 in the protection phase is illustrated in detail below, with reference to FIG. 6.

The Management Module 280 is responsible for exchanging management requests and information with, for example, the Human Machine Interface 144, as well as, for example, other modules within the Industrial Protection Technology Server 142, and the Cyber Security Management Console 154. Management functionality of the Human Machine Interface 144 may include, for example, transitioning the Industrial Protection Technology Server between learning phase and protection phase. Indications sent by the Management Module 280 to the Cyber Security Management Console 154 include, for example, alerts indicating reception of suspicious packets.

Figure 3:
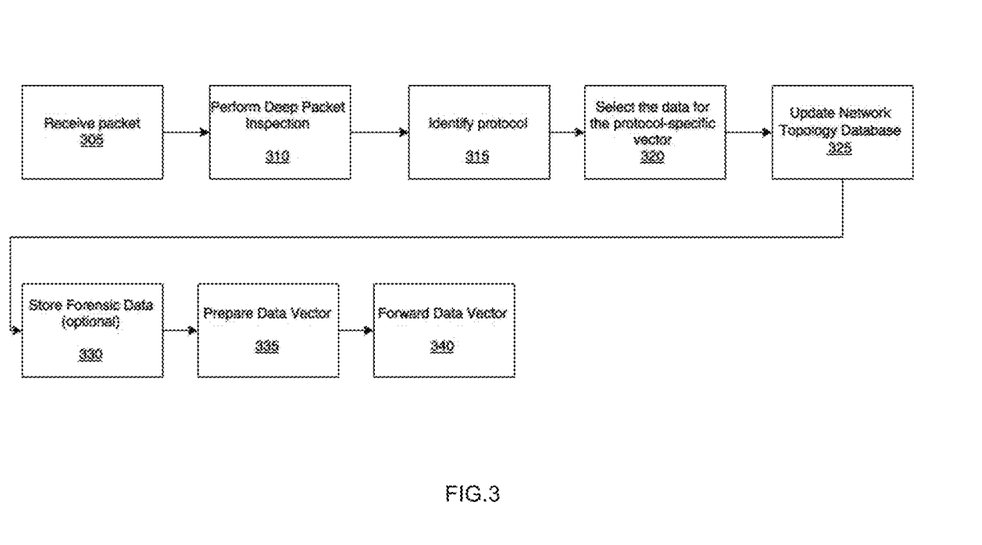
FIG. 3 is a flow diagram illustrating the logic implemented in the Data Collection Module.

The procedure followed by the Data Collection Module 250 is illustrated as a flow diagram in FIG. 3. With this flow diagram, as with other flow diagrams herein, the processes and/or subprocesses of the flow diagrams, are, for example, performed either automatically, manually, and combinations thereof, and in real time.

At block 305, the system receives a packet from, for example, a Network Interface 240. Alternatively, the Data Collection Module 250 process may also receive a packet from, for example, a packet capture that resides in a file on a hard drive.

At block 310, the Data Collection Module 250 process performs deep packet inspection (DPI) on the packet. At block 315, the protocol type is determined on the basis of, for example, the result of the deep packet inspection. For example, in a deployment where transport protocols are encapsulated in the Ethernet protocol (as in a ease where Modbus-over-Transport Control Protocol/Internet Protocol (TCP/IP) is utilized), the Data Collection Module 250 process may examine Ethernet fields such as the ether type or Virtual Local Area Network (VLAN) Id, together with higher layer fields such as Modbus function code and unit identifier, Payload data such as the data structures carried in a DNP3 message may also, for example, be used to determine the protocol type.

Alternatively, the system may determine the protocol type without deep packet inspection. For example, in a circumstance where the physical interface of the industrial Protection Technology Server is a Modbus controller, only Modbus may be received, In this situation, the deep packet inspection may be unnecessary and thus omitted.

The protocol type may be, for example, one of the ICS protocols used in industrial settings. These include Modbus, OPC, International Electrotechnical Commission (IEC) 61850 DNP3, and the like. The protocol type may also be, tot example, one of the ICS protocols encapsulated in a transport protocol such as TCP/IP e.g., Modbus-over-TCP/IP, DNP3-over-TCP/IP and the like. It will be understood that this method is general, and applies equally to any type of message format or protocol which appears on the network.

At block 320, the system selects specific fields from, for example, the received packet which reveal, for example, the cyclical behavior of the industrial network. The industrial network traffic may use a protocol in which for example, a controller-type entity repeatedly sending inquiries or commands to devices, which perform an industrial process. In such an industrial network, the system may, for example, select the fields of the protocol which signify the identities of the peers and the particular commands and queries.

For example, in the specific case of a packet whose protocol type is Modbus, the 1 byte slave address may, for example, be part of such a data set that reveals the cyclical nature of the transactions on the industrial network. The Modbus function code field is another example of packet data that may be part of such a data set. Packet metadata such as arrival time and physical input port may also be part of such a data set.

At block 325, the system updates the Network Topology Database 255 to, for example, reflect the addresses of the master and slave communicating in the current packet. The process may also, for example, eliminate inactive addresses from the Network Topology Database 255. These updates to the Network Topology Database 255 are, for example, performed when the Industrial Protection Technology Server is in the learning phase only.

At block 330, the system optionally stores network forensic data associated with the packet, to be used later if, for example, an alert is generated. At block 335, the system prepares a data vector based on the selected data set. At block 340, the system passes the data vector to, for example, the State Machine Module 250.

Figure 4:
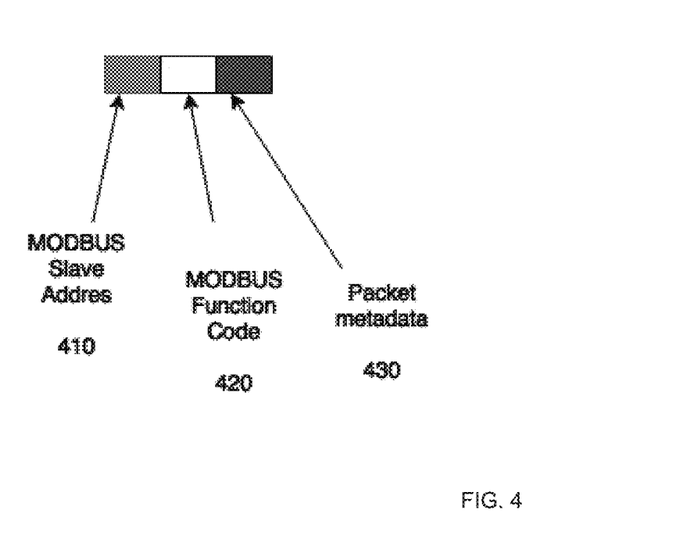
FIG. 4 is an exemplary protocol-specific vector input to the State Machine Module and optional Scenario-based Alert Module.

FIG. 4 shows an exemplary vector created by the Data Collection Module 250 from a packet containing the Modbus protocol. The vector begins with the 8-bit Modbus Slave Address 410, followed by the Modbus Function Code 420. Finally there is Metadata 430, such as input port or arrival time.

The vector illustrated in FIG. 4 serves as an example only and does not intend to specify a particular data structure or content. Deployments with other topologies or other industrial protocols may utilize different vector formats.

Figure 5:
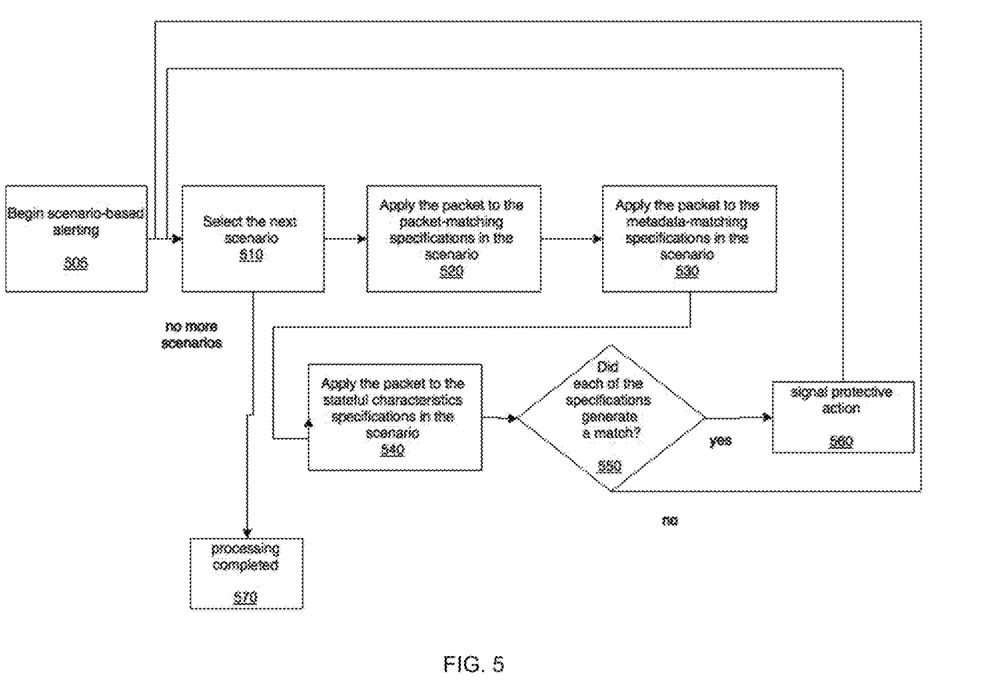
FIG. 5 is a flow diagram of logic implemented in the Scenario-based Alert Module.

The procedure followed by the optional Scenario-based Alert Module 260 is illustrated as a flow diagram in FIG. 5. Processing begins with block 505. At block 510 the first scenario from, for example, the Scenarios for Alert Database 265 is selected.

At block 520, the packet is applied to the packet-matching specifications in the scenario (if present). The packet matching specifications include offsets and data patterns to be evaluated in the packet. For example, a packet-matching specification may specify a particular destination IP (Internet Protocol) address known to belong to a malicious site. The result of the application of the packet to the packet-matching specifications in the scenario will be, for example, either a "match" or a "non-match".

At block 530, the packet is applied to the metadata-matching specifications of the scenario (if present). For example, a metadata-matching specification may specify a particular input port that requires special supervision. Alternatively, a metadata-matching specification may, for example, specify a particular interpacket arrival time value or range. The result of the application of the packet to the metadata-matching specifications in the scenario will be, for example, either a "match" or a "non-match".

At block 540, the packet is applied to the stateful characteristics specifications of the scenario (if present). For example, if the scenario is specified to match upon detecting the disappearance of a device, then a packet that constitutes an unanswered request (after a certain threshold of unanswered requests) will constitute a match. The application of the packet to the stateful characteristics specifications of the scenario may also, for example, change stateful contents of the specification (e.g., counters and timers).

At block 550 the system determines whether the application of the packet to the scenario structure resulted in a match for each of the 3 specifications in the scenario (i.e., packet matching, metadata-matching, stateful characteristics matching). If so then at block 530 the system examines the Directive 699 associated with the matched scenario. If the directive is to alert, then at block 560 the Scenario-based Alert Module 260 process, raises an alert by, for example, displaying a message on an administrator's console. Alternatively, the system may, for example, send a signal to the Management Module 280 that a particular event has been detected.

The process then returns to block 510, and the next scenario is selected. If the list of scenarios is exhausted, then at block 570 Scenario-based Alert processing is completed until a new packet is received.

Figure 6:
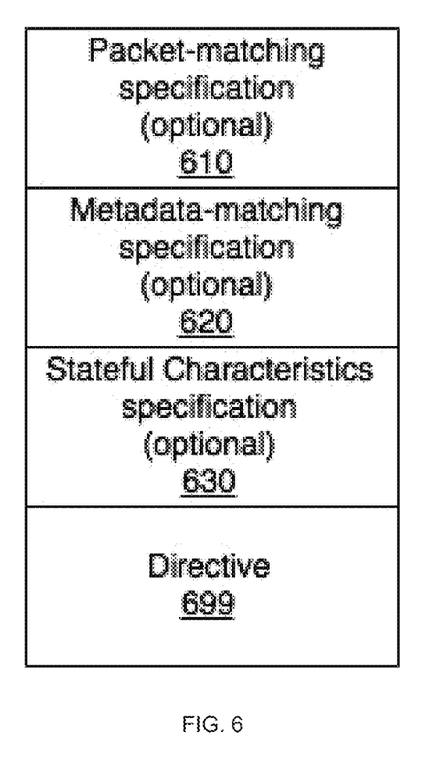
FIG. 6 is an exemplary packet-based scenario data structure.

FIG. 6 illustrates an exemplary scenario data structure. The exemplary packet-based scenario data structure begins with an optional Packet-matching Specification 610. The Packet-matching Specification 610 comprises, for example, one or more packet pattern matching tuples, where each packet matching tuple comprises, for example, an Offset value indicating where in the packet the pattern should be matched, a data-matching pattern and a value indicating the length of the pattern to be matched.

The optional Metadata-matching Specification 620 comprises, for example, a series of metadata-identifier and metadata-value pairs, where each pair identifies a type of metadata and a value to be matched. For example the metadata-identifier and metadata value pair may specify that if the packet input port is port 0 then a match occurs. Alternatively, for example, the metadata-identifier and metadata value pair may specify that if the packet interarrival time is below a certain value, then a match occurs.

The optional Stateful Characteristics Specification 630 comprises, for example, a series of stateful characteristic identifier, stateful characteristic value, and persistent state tuples, where each tuple identifies a type of stateful characteristic and a value to be matched, and includes persistent state information so that checks can be made across packets. For example, the stateful characteristic identifier and stateful characteristic identifier pair may specify that if 1000 instances of a particular packet are received in a 1 second interval, then a match occurs.

The directive 699 specifies how the packet should be handled if the packet data, metadata, and stateful characteristics specifications result in a match with a packet. The directive 699 may have, for example, two values: one value to signify that the packet trigger an alert, and as second value to indicate that the packet should not trigger an alert.

Figure 7:
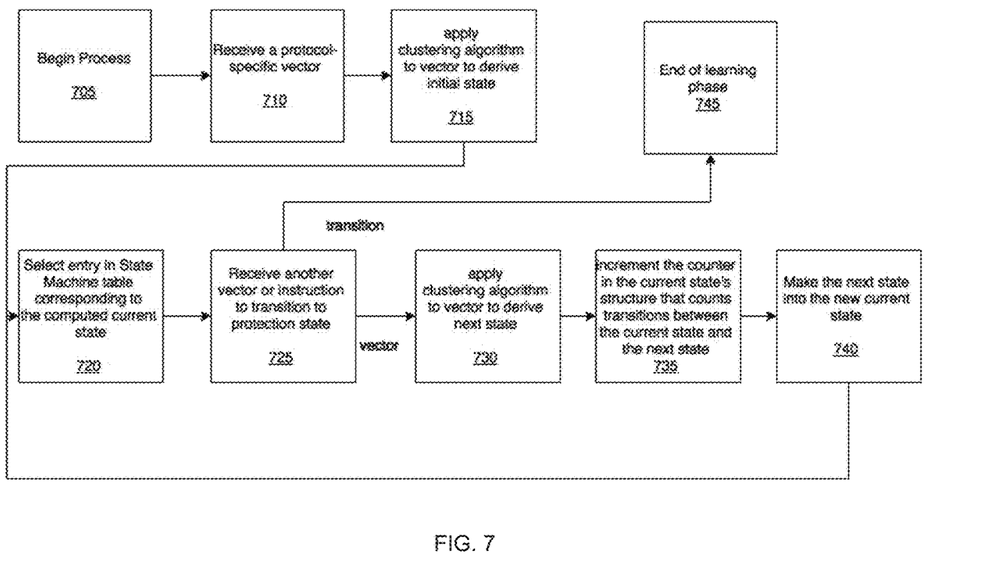
FIG. 7 is a flow diagram of logic implemented in the State Machine Module in learning phase; and, FIG. 8 is a flow diagram of logic implemented in the State Machine Module in the protection phase.

The exemplary procedure followed by the State Machine Module 270 while in learning phase is shown in as a flow diagram in FIG. 7. At block 705, the process begins. At block 710, the system receives an input vector from, for example, the Data Collection Module 250. The vector represents data fields and metadata from a packet in a normal sequence of packets. At block 715, the system applies the clustering algorithm to the received vector resulting in a numerical value that is termed the "initial state" and is also the "current state". At block 720, the system selects the entry in the Network Behavior State Machine 275 table that corresponds to the initial state. At block 725, the system receives either another vector, and an instruction to transition to the protection phase. If another vector was received, then at block 730 the clustering function is applied to the vector, resulting in a numerical value that is termed the "new state". At block 735, the system increments the transition counter in the Network Behavior State Machine 275 table entry that counts transitions between the current state and the new state. At block 740, the value of the "current state" is set to the value of the "new state". Control then returns to block 720, to select the state control data for the new current state. When an instruction to transition to protection phase is received, then at block 745 the learning phase ends.

This description of the Machine Learning Engine 270 procedure during the learning phase determines a "state" upon the receipt of a new input vector from a received packet. Other embodiments may behave differently. For example, the procedure in a particular embodiment may accumulate a fixed number of packets before applying the clustering function to determine a new state, Alternatively the procedure may, for example, receive a stream of packets until a particular event and then apply the clustering function to the accumulated packets to determine a new state.

The procedure followed by the Machine Learning Engine 270 while in protection phase is shown in FIG. 8.

At block 805, the system receives a vector. At block 810, the system applies the clustering algorithm to derive the "new state" from the received vector. At block 815, the system uses the transition count information in the Network Behavior State Machine 275 to compute the probability that the new state follows the current state. At block 820, the system uses the result of the computation of block 815, in conjunction with the results of the computations of block 815 on previous vectors, to compute the probability of the sequential occurrence of the last "k" states (where "k" is a constant that is specific to the embodiment and is greater than 2). At block 825, the system compares this probability to an alert threshold. If the probability is below the alert threshold, then an anomaly has occurred and at block 830, the system takes protective action such as, for example, raising an alert. Control then returns to block 805 for receipt of the next vector.

In its processing, the Machine Learning Engine 270 may also for example, perform "cross-correlation" with other instances of the Industrial Protection Technology Server. In "cross-correlation", the Machine Learning Engine 270, for example, enquires over the network of other Industrial Protection Technology Server instances to determine the state of the monitored parameters of those instances. The Machine Learning Engine 270 may then, for example, use this state information in its evaluation of whether the currently processed packet is anomalous or non-anomalous.

The invention has been described in detail for an embodiment wherein a copy of each packet is sent to the ICS appliance. Alternatively, an embodiment may, for example, examine each packet as it passes through a forwarding device or gateway. In such an embodiment, the determination to take protective action may, for example, be accompanied by dropping the packet rather than forwarding it.

The invention has been described in detail for an embodiment wherein the protective action taken by the ICS appliance is sending an alert to the Cyber Security Management Console 154. Alternatively, an embodiment may, for example, take action to disable a node that is generating or forwarding anomalous traffic. In such an embodiment, the ICS appliance may, for example, use a management protocol such as SNMP to manage the particular node and disable it.

Alternatively, an embodiment may, for example, take protective action to disable node that is generating or forwarding anomalous traffic. In such an embodiment, the ICS appliance may, for example, use a management protocol such as SNMP to manage the particular node and disable it.

Alternatively, an embodiment may, for example, take protective action to program nodes in the network so that they will drop traffic that matches a particular pattern. In such an embodiment, the ICS appliance may, for example, use a management protocol such as SNMP to manage the particular node.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art, Accordingly, it is intended to embrace all such alternatives, modifications and variations that fall within the spirit and broad scope of the appended claims.

The invention claimed is:

1. A method for detecting a potential compromise of cyber security in an industrial network utilizing a protocol for controlling an industrial process, comprising:

polling specific fields of packet data, obtained from packets, at a fixed frequency, for a plurality of programmable logic controllers (PLCs), to establish network behavior;

determining a protocol type from the specific packet data fields;

deriving a vector based on the specific packet data fields, wherein the specific packet data fields represent the protocol which signifies particular network communications, including communications using a stateful protocol as the determined protocol type;

generating a value based on the vector indicative of a network behavioral state;

maintaining a network behavior state machine comprising a list of network states and transition counts in accordance with the stateful protocol, wherein the transition count is maintained in accordance to the value;

determining a transition probability corresponding to the transition counts, wherein the transition probability denotes an estimated probability of a first network state being followed temporally by a second network state, during normal network operation;

establishing, for the network behavior state machine, a threshold representing the probability below which a sequence of network states is anomalous;

determining, by the network behavior state machine, a probability for the occurrence of a sequence of network states, according to the derived vector; and, taking protective action according to whether the determined probability is below the established threshold.

* * * * *